United States Patent [19]

Falk

[11] Patent Number: 4,485,875

[45] Date of Patent: Dec. 4, 1984

[54] PROCESS FOR SELECTIVELY PLUGGING PERMEABLE ZONES IN A SUBTERRANEAN FORMATION

[75] Inventor: David O. Falk, Denver, Colo.

[73] Assignee: Marathon Oil Company, Findlay, Ohio

[21] Appl. No.: 470,751

[22] Filed: Feb. 28, 1983

[51] Int. Cl.$^3$ .................. E02D 3/12; E21B 33/138
[52] U.S. Cl. .................................. 166/295; 166/270; 166/272; 405/264; 523/130
[58] Field of Search ............ 166/295, 294, 270, 274, 166/281, 272; 523/130–132; 405/264

[56] References Cited

U.S. PATENT DOCUMENTS

| | | | |
|---|---|---|---|
| 3,495,412 | 2/1970 | Sakata et al. | 405/264 |
| 4,289,203 | 9/1981 | Swanson | 166/274 |
| 4,291,069 | 9/1981 | Pilny | 427/140 |
| 4,300,634 | 11/1981 | Clampitt | 166/272 |
| 4,323,123 | 4/1982 | Swanson | 166/283 X |

*Primary Examiner*—Stephen J. Novosad
*Attorney, Agent, or Firm*—Jack L. Hummel; Rodney F. Brown

[57] ABSTRACT

Highly permeable zones in a subterranean formation are selectively plugged by injecting an aqueous solution of an acrylamide polymer, a phenol and an aldehyde via a well into the highly permeable zones. The solution forms a non-flowing, water insoluble polymer resin in situ at a temperature of from about 50° C. to 100° C. and an alkaline pH over a period of from about 1 to 10 days. The polymer resin plugs the highly permeable zones of the formation.

19 Claims, No Drawings

PROCESS FOR SELECTIVELY PLUGGING PERMEABLE ZONES IN A SUBTERRANEAN FORMATION

DESCRIPTION

TECHNICAL FIELD

The invention relates to a process for selectively plugging highly permeable zones in a subterranean formation and to the plugging composition, a polymer resin.

BACKGROUND ART

Fluids preferentially migrate into highly permeable zones in subterranean formations. This migration is undesirable when injecting treatment fluids into hydrocarbon-bearing formations for post-primary recovery of residual hydrocarbons. The treatment fluids channel through the highly permeable zones bypassing the less permeable zones. The result is poor conformance and flow profiles of the treatment fluid in the formation. The hydrocarbons residing in the less permeable zones are not produced and the overall yield of hydrocarbons from the formation is reduced.

Highly permeable zones in subterranean formations are plugged to prevent migration of treatment fluids into them and to divert treatment fluids into adjacent less permeable zones. One plugging method is to inject fluids into the formation prior to treatment fluids. The injected plugging fluids preferentially enter and plug the highly permeable zones. Subsequently injected treatment fluids are diverted into less permeable zones facilitating recovery of the hydrocarbons therein.

It can be desirable to prevent migration of fluids in subterranean porous media other than hydrocarbon-bearing formations, such as soils. Plugging fluids are injected into soil as stabilizers to reduce soil permeability. Soil stabilizers seal subterranean building structures to prevent migration of water into the structure. Soil stabilizers also prevent seepage of water through permeable water retainers such as irrigation ditches and earthen dams.

A number of processes are known for reducing the permeability of soils. U.S. Pat. No. 4,291,069 to Pilny teaches a process for plugging a porous subterranean formation with an aqueous gel composed of an amide polymer and a water-soluble polyaldehyde. The polymer and polyaldehyde are mixed at an alkaline pH. They react to form a gel within the formation after a short time at ambient temperature. U.S. Pat. No. 3,495,412 to Sakata et al teaches a process for stabilizing a water-permeable soil. A three-component aqueous solution comprising urea, formaldehyde and polyvinyl alcohol is injected into a water-permeable soil where it is cured with an acidic substance.

Polymer plugs are used specifically in hydrocarbon recovery processes. U.S. Pat. No. 4,289,203 to Swanson teaches an oil displacement method using a shear-thickening composition which contains water, a high molecular weight polyalkylene oxide and a phenolformaldehyde synthetic resin. The composition is a liquid in its quiescent state, but assumes a gel-like character upon agitation. The gel is useful as a water diversion agent.

U.S. Pat. No. 4,300,634 to Clampitt teaches using a polymer in conjunction with a steam injection process. A fluid is injected into a hydrocarbon-bearing formation prior to steam treatment. The injected composition contains aldehyde and phenol gelling agents, a polymer, a surfactant, and water. Once in place the polymer prevents the surfactant from foaming until the steam treatment begins. However, the polymer breaks down under the high temperature of the steam treatment allowing the surfactant to foam. The resulting foam plugs the more permeable zones of the formation and directs the steam into the less permeable zones. The foam utilizes steam as the gas phase and is self-collapsing upon termination of the steam treatment.

Partially hydrolyzed polyacrylamide is gelled in situ to reduce the permeability of highly permeable zones in a hydrocarbon-bearing formation prior to fluid treatment. Partially hydrolyzed polyacrylamide and a cross-linking agent, a polyvalent metal such as chromium or aluminum, are injected into the formation. The gel sets in the more permeable zones of the formation. The concentration of cross-linking agent determines the gelation rate.

The gels taught by the above-cited prior art processes tend to be thermally unstable in a hydrocarbon-bearing formation environment. As such, the gels provide only temporary plugs of hydrocarbon-bearing formations. They are particularly disadvantageous for high temperature steam injection processes. Furthermore, the in situ gelation time of the prior art gels is difficult to control.

A need exists for a process to selectively prevent the migration of fluids into highly permeable zones of a subterranean formation under elevated thermal conditions. A process is needed, which injects a fluid into the highly permeable zones and then reacts the fluid in situ under formation conditions to produce a non-flowing, water insoluble plug. A process is needed to provide a rigid and permanent plug of the selected highly permeable zones.

DISCLOSURE OF INVENTION

The present invention provides a process for selectively plugging highly permeable zones in a subterranean formation with a polymer resin. An aqueous solution of an acrylamide polymer, a phenol and an aldehyde is injected into an alkaline formation environment. The solution preferentially migrates into the highly permeable zones of the formation. The solution reacts in situ to produce a non-flowing, water insoluble polymer resin. The polymer resin permanently plugs the highly permeable zones.

BEST MODE FOR CARRYING OUT THE INVENTION

The present invention relates to a process for selectively plugging highly permeable zones in a subterranean formation with a non-flowing, water insoluble polymer resin. The process comprises combining an acrylamide polymer, a phenol and an aldehyde in an aqueous solution. The resulting solution reacts in an alkaline environment to form the non-flowing, water insoluble polymer resin, which remains rigidly in place under elevated thermal conditions.

A polymer resin is an amorphous, water insoluble solid. The resin components are linked by chemical bonds in a dense, but random network to form a single large molecular mass. A polymer is a necessary building block of the polymer resin.

The polymer building block of the polymer resin is a water soluble acrylamide polymer. The acrylamide polymer is either a polyacrylamide homopolymer or copolymer containing acrylamide. Up to about 40% of the amide groups of the polyacrylamide homopolymer can be hydrolyzed, i.e. up to 40% of the amide groups can be converted to carboxyl groups, leaving the remaining 100% to about 60% of the amide groups unhydrolyzed. The copolymer is comprised of acrylamide and a second suitable monomer. Examples of the suitable monomer include styrene, acrylonitrile, methylacrylate, methyl methylacrylate, vinyl acetate, sodium arcylate and the like. The copolymer contains from about 99.99% to about 60% by weight unhydrolyzed acrylamide groups and from about 0.01% to about 40% by weight of the second monomer, which is preferably sodium acrylate. The unhydrolyzed polyacrylamide homopolymer containing 100% unhydrolyzed acrylamide groups is the most preferred acrylamide polymer. The acrylamide polymer has a molecular weight of from about 100,000 to about 10,000,000 and preferably about 1,000,000 to about 6,000,000.

Preparation of the acrylamide polymer is known to one of ordinary skill in the art. Polyacrylamides can be prepared by polymerizing an aqueous solution of acrylamide with known catalyst systems. The resulting polyacrylamide is thereafter diluted with water. U.S. Pat. No. 4,034,809 to Phillips et al teaches a method for partial hydrolysis of polyacrylamide.

The phenol is comprised of a benzene ring with at least one hydroxyl group attached to the ring. There can be additional substituents on the ring. However, at least three unsubstituted sites must remain on the ring. Monohydroxic phenols are preferred. Monohydroxylbenzene is the most preferred phenol.

The aldehyde is either a monoaldehyde or a dialdehyde. The aldehyde preferably contains from one to about four carbon atoms. Exemplary monoaldehydes are formaldehyde and acetaldehyde. Glyoxal is an exemplary dialdehyde. Formaldehyde is the most preferred aldehyde.

According to one embodiment, the reactants are combined above ground at ambient atmospheric temperature, about 20° C. The phenol is added to an aqueous solution containing the acrylamide polymer. Any aqueous solvent such as brine or fresh water may be used. However, soft water is the preferred aqueous solvent. A concentrated aldehyde solution is finally added to the reaction solution.

It is preferred that the initial concentrations in the reaction solution are such that the moles of the phenol exceed the equivalents of unhydrolyzed acrylamide groups and that the equivalents of aldehyde groups exceed the moles of the phenol. It is most preferred that the ratio of equivalents of unhydrolyzed acrylamide groups:moles of phenol:equivalents of aldehyde groups initially present in the reaction solution be about 1:3:7 to ensure resin formation.

Where unhydrolyzed polyacrylamide, monohydroxylbenzene and formaldehyde are the reactants, the relative weight concentrations of the reactants initially present in the reaction solution are as follows. The concentration of polyacrylamide is from about 0.1% to about 1.0% and preferably it is about 0.5%. The concentration of monohydroxylbenzene is from about 0.5% to about 10% and preferably about 1% to about 2%. The most preferred concentration is about 2%. The concentration of formaldehyde is from about 0.5% to about 10% and preferably about 1% to about 2%. The most preferred concentration is about 1.4%.

It is necessary that the reaction be initiated in an alkaline environment. The formation water is generally slightly alkaline due to natural carbonate rock. However, according to one embodiment the formation is pre-flushed with an alkaline solution to adjust the pH of the formation water to an optimal level for resin formation. The pH of the formation water is preferably adjusted within a range of from about 7 to about 12 and most preferably from about 8 to about 9. The initial pH of the formation water can be adjusted by pre-flushing with basic organic compounds, basic inorganic compounds, basic inorganic hydroxide compounds or basic buffer compounds. Examples of basic compounds include sodium hydroxide, inorganic and quaternary ammonium hydroxides, organic amines, and sodium phosphate buffer. Sodium hydroxide is the preferred base.

The preferred embodiment is to add the base directly to the reaction solution at the surface in an amount such that the pH of the reaction solution is from about 7 to about 12 and preferably about 8 to about 9. About 20 to about 100 barrels of the completed reaction solution are immediately injected into the highly permeable zones via a well at a rate of about 100 to about 400 barrels per day before the solution substantially increases in viscosity. The preference of the reaction solution to enter the highly permeable zones can be further ensured by the use of packers.

The temperature of the formation water must be within a range of from about 50° C. to about 100° C. and preferably from about 70° C. to about 80° C. for the polymer resin reaction to proceed. The reaction temperature can be regulated in situ to a certain degree by injecting fluid at predesigned temperatures. Where the temperature of the formation water is near the low end of the range, below about 50° C., it is possible to drive the reaction by increasing the initial pH of the formation water and/or the concentration of the reactants.

The polymer resin does not begin to form in appreciable amounts until the reaction solution is in place in the highly permeable zones and has reached the temperature of the formation water. Initiation of the reaction occurs relatively quickly once the reaction solution reaches the formation water temperature.

The reaction goes to completion in the alkaline reaction environment. However, reducing the pH of the reaction after initiation to as low as about 5 increases the rate of resin formation. The pH is reduced by injecting an acid such as hydrochloric acid into the highly permeable zones. An elapsed reaction time of at least about four hours is required to allow initiation before the pH of the reaction is reduced. Reaction time begins from the time the reaction solution reaches the reaction temperature, i.e. formation water temperature. Reducing the pH of the reaction solution after a reaction time of less than four hours does not substantially increase the rate of resin formation.

The reaction time is a function of the reaction temperature, pH and concentration of the reactants. The reaction parameters are controlled within the ranges given herein such that the reaction time is from about one to about ten days and preferably about two to about four days.

The viscosity of the reaction solution increases as the reaction progresses. The reaction is near completion when the viscosity of the polymer resin product exceeds 166,000 centipoise (cps). Upon completion of the reaction, the reaction solution has set to a permanent, non-flowing, water insoluble polymer resin in the highly permeable zones of the formation. If a packer has been used, it is removed from the well bore. Post-primary treatment fluids such as water, polymer, micellar/polymer, etc. are injected into the formation to enhance recovery of hydrocarbons therefrom.

The process is particularly suitable as a pre-treatment for steam flooding. Steam floods are carried out at temperatures from about 100° C. to about 250° C. The injected, high temperature steam additionally cures the polymer resin, which in turn prevents the migration of the steam into the highly permeable zones of the formation.

The polymer resin is believed to be produced by various linking mechanisms. The methylolation of a phenol or an acrylamide polymer initiates resin formation. Under alkaline conditions a phenol reacts with an aldehyde to form a resin intermediate, methylolophenol. The methylolation of phenol by aldehyde and the bonding of methylolphenol to phenol is described in the prior art. See Lang, *Organic Chemistry of Synthetic High Polymers*, Interscience Wiley, New York, N.Y., 1967. Methylolphenol also bonds with acrylamide polymer. Types of bonding, which can occur between methylolphenol and acrylamide polymer or between methylolphenol and phenol include: (1) ether linkages; (2) methylene linkages; and (3) acetylene linkages.

Acrylamide polymers are thought to be methylolated by aldehyde under alkaline conditions. The methylol groups on the methylolated acrylamide polymer are sites for bonding between methylolated acrylamide polymer and phenols.

It is critical to combine the reactants under alkaline conditions. Methylolation of phenols and acrylamide polymer does not occur under acid conditions. Monohydroxylbenzene and formaldehyde condense in the presence of acid to form low molecular weight poly(hydroxyphenyl methylene) molecules containing from about two to about ten hydroxyphenyl methylene groups. Creation of the low molecular weight molecules blocks formation of the network polymer resin.

Once the methylolated intermediates are formed, they combine with the remaining unreacted phenols and acrylamide polymer to form the network resin. The extent and rate of reaction of the methylolated intermediates with the phenol and polymer are enhanced by reducing the alkalinity of the reaction after formation of the intermediates. The addition of acid catalyzes methylene and acetylene bonding, which occurs in addition to ether bonding.

The physical and chemical properties of the polymer resin product are dependent on the degree and type of bonding, which occurs between the resin components. The greater the number of reaction sites present on the starting materials and intermediates, the higher the degree of network bonding in the resin. A high degree of bonding within the polymer resin creates the water insoluble, rigid yet amorphous structure of the polymer resin.

The most preferred reactants contain the greatest number of reaction sites. Of the phenols, monohydroxylbenzene contains the greatest number of reaction sites at the unsubstituted carbons on the benzene ring. Unhydrolyzed polyacrylamide has the greatest number of reaction sites of the acrylamide polymers, because of its high concentration of reactive amide groups.

Steric factors influence the selectivity of reaction sites and ultimately the structure of the polymer resin product. A methylolated polymer is unlikely to bond with another polymer, because of steric hindrance. The methylolated polymer first bonds to one or more phenols at the methylolated side chain before linking with an adjoining acrylamide polymer.

The present process and composition are not to be limited by the particular mechanisms described herein. The possible structures of the polymer resin are provided above to illustrate the broad range of structures that can occur within the produced resin. By practicing the process of the invention other resin structures can be produced, which are within the scope of this invention.

The following examples are illustrative of the present invention and are not to be construed as limiting the scope thereof. All concentrations are given on a percent by weight basis unless noted otherwise.

EXAMPLE 1

0.5 g of reagent grade, solid phenol is dissolved in 50 ml of 0.5% aqueous unhydrolyzed polyacrylamide solution using a magnetic stirring bar. The molecular weight of the polyacrylamide is about 5,000,000. 1.0 ml of reagent grade 37% concentrated formaldehyde solution is added to the reaction solution resulting in relative concentrations of about 0.5% polyacrylamide, 1.0% phenol and 0.72% formaldehyde in the reaction solution. 0.25 ml of a 10% sodium hydroxide solution is added to adjust the initial pH of the reaction solution to 8.9. The reaction solution is maintained at a temperature of 50° C. in a water bath. After four days, the reaction solution has a Brookfield viscosity reading of 4.0 TB. After eight days the reaction solution is heated to 100° C. and maintained at that temperature for five additional days. It is then cooled to measure viscosity. The product is a non-flowing polymer resin with a Brookfield viscosity reading of 100+. This converts to a viscosity of greater than 166,000 centipoise.

EXAMPLE 2

1.0 g of solid phenol is dissolved in the polymer solution of Example 1. 2.0 ml of 37% formaldehyde solution is added to the reaction solution resulting in relative concentrations of about 0.5% polyacrylamide, 2.0% phenol and 1.44% formaldehyde in the reaction solution. 1.25 ml of a sodium phosphate solution is added to adjust the initial pH of the reaction solution to 8.6. The reaction solution is maintained at a temperature of 50° C. After eight days the reaction solution has a Brookfield viscosity reading of 4.5 TB and a pH of 8.5. The pH of the reaction solution is adjusted downward with hydrochloric acid to a pH of 7.05. After nine days the product is a non-flowing polymer resin with a Brookfield viscosity reading of 100+ TF.

EXAMPLE 3

0.35 ml of a 10% sodium hydroxide solution is added to the initial polyacrylamide/phenol/formaldehyde reaction solution of Example 2 to adjust the initial pH of the reaction solution to 8.95. The reaction solution is maintained at a temperature of 75° C. The initial viscosity reading of the reaction solution is 1.5 TB. After two days the viscosity reading of the reaction solution is 32.5 TF. After five days the product is a non-flowing polymer resin with a Brookfield viscosity reading of 100+ TF.

EXAMPLE 4

Five drops of a 10% sodium hydroxide solution are added to the initial polyacrylamide/phenol/formaldehyde reaction solution of Example 2 to adjust the pH of the reaction solution of 7.95. The reaction solution is maintained at a temperature of 75° C. After one day the viscosity reading of the reaction solution is 3.0 TB. After two days the product is a non-flowing polymer resin with a Brookfield viscosity reading of 100+ TF.

EXAMPLE 5

Two drops of a 10% sodium hydroxide solution are added to the initial polyacrylamide/phenol/formaldehyde reaction solution of Example 2 to adjust the pH of the reaction solution to 7.45. The reaction solution is maintained at a temperature of 75° C. After one day the viscosity reading of the reaction solution is 3.7 TB. After two days the viscosity reading of the reaction solution is 4.0 TB. After five days the product is a slightly flowing polymer resin.

EXAMPLE 6

2.0 g of solid phenol is dissolved in the polymer solution of Example 1. 4.0 ml of 37% formaldehyde solution is added to the reaction solution resulting in relative concentrations of about 0.5% polyacrylamide, 4.0% phenol and 2.88% formaldehyde in the reaction solution. 0.5 ml of 10% sodium hydroxide solution is added to the reaction solution to adjust the initial pH of the reaction solution to 8.65. The reaction solution is maintained at a temperature of 75° C. After four days the product is a non-flowing polymer resin.

Example 7

0.5 ml of 10% sodium hydroxide solution is added to the initial polyacrylamide/phenol/formaldehyde reaction solution of Example 6 to adjust the pH of the reaction solution to 8.7. The reaction solution is maintained at a temperature of 75° C. After one day the pH of the reaction solution is adjusted downward by the addition of hydrochloric acid and a non-flowing polymer resin is produced.

EXAMPLE 8

0.25 ml of a sodium phosphate solution is added to the initial polyacrylamide/phenol/formaldehyde reaction solution of Example 6 to adjust the pH of the reaction solution to 7.2. The reaction solution is maintained at a temperature of 75° C. After seven days the product is a non-flowing, but moving gel-like, layered polymer resin.

EXAMPLE 9

0.75 ml of a sodium phosphate solution is added to the initial polyacrylamide/phenol/formaldehyde reaction solution of Example 6 to adjust the pH of the reaction solution to 8.0. The reaction solution is maintained at a temperature of 75° C. After seven days the product is a non-flowing, layered polymer resin exhibiting less movement than the product of Example 8.

EXAMPLE 10

2.25 ml of a sodium phosphate solution is added to the initial polyacrylamide/phenol/formaldehyde reaction solution of Example 9 to adjust the pH of the reaction solution to 8.7. The reaction solution is maintained at a temperature of 75° C. After four hours the pH of the solution is adjusted to 7.0 by the addition of hydrochloric acid. After seven days the product is a non-flowing, homogeneous, moving gel-like, polymer resin.

EXAMPLE 11

2.0 g of solid phenol is dissolved in 4.0 ml of 37% formaldehyde solution and water resulting in relative concentrations of about 4.0% phenol and 2.88% formaldehyde in the reaction solution. 0.75 ml of sodium phosphate solution is added to the reaction solution to adjust the pH of the reaction solution to 8.85. The reaction solution is maintained at a temperature of 75° C. After one day a precipitate forms in the solution. After seven days the product is a mixture of a precipitate and water of about equal parts.

Examples 1–11 are summarized in the following Table:

TABLE

| example | reaction time (hr) | concentration of reactants (wt %) | | | moles of reactants | | | pH adjuster | adjusted pH of reaction | reaction temperature (±5° C.) | Brookfield* viscosity reading |
|---|---|---|---|---|---|---|---|---|---|---|---|
| | | PA | phenol | formaldehyde | PA | phenol | formaldehyde | | | | |
| 1 | 0 | 0.5 | 1.0 | 0.7 | 0.0035 | 0.0054 | 0.012 | NaOH | 8.9 | 50 | — |
| | 19 | | | | | | | | 8.55 | 50 | 3.0 TB |
| | 91 | | | | | | | | 8.6 | 50 | 4.0 TB |
| | 194 | | | | | | | | — | 100 | — |
| | 280 | | | | | | | | — | — | 100+ TF (non-flowing) |
| 2 | 0 | 0.5 | 2.0 | 1.44 | 0.0035 | 0.011 | 0.025 | Na$_3$PO$_4$ | 8.6 | 50 | — |
| | 24 | | | | | | | | — | 50 | 2.4 TB |
| | 192 | | | | | | | | — | 50 | 4.5 TB |
| | 196 | | | | | | | HCl | 7.05 | 50 | — |
| | 216 | | | | | | | | — | 50 | 100+ TF (non-flowing) |
| 3 | 0 | 0.5 | 2.0 | 1.44 | 0.0035 | 0.011 | 0.025 | NaOH | 8.95 | 75 | — |
| | 6.75 | | | | | | | | 8.5 | 75 | 1.5 TB |
| | 23 | | | | | | | | 8.9 | 75 | 5.5 TB |
| | 48 | | | | | | | | — | 75 | 32.5 TF |
| | 120 | | | | | | | | — | 75 | 100+ TF (non-flowing) |
| 4 | 0 | 0.5 | 2.0 | 1.44 | 0.0035 | 0.011 | 0.025 | NaOH | 7.95 | 75 | — |
| | 23 | | | | | | | | 7.9 | 75 | 3.0 TB |
| | 48 | | | | | | | | — | 75 | 100+ TF (non-flowing) |
| 5 | 0 | 0.5 | 2.0 | 1.44 | 0.0035 | 0.011 | 0.025 | NaOH | 7.45 | 75 | — |
| | 23 | | | | | | | | 7.2 | 75 | 3.7 TB |
| | 47 | | | | | | | | 6.6 | 75 | 4.0 TB |
| | 120 | | | | | | | | — | 75 | — (slight flowing) |

TABLE-continued

| example | reaction time (hr) | concentration of reactants (wt %) PA | concentration of reactants (wt %) phenol | concentration of reactants (wt %) formaldehyde | moles of reactants PA | moles of reactants phenol | moles of reactants formaldehyde | pH adjuster | adjusted pH of reaction | reaction temperature (±5° C.) | Brookfield* viscosity reading |
|---|---|---|---|---|---|---|---|---|---|---|---|
| 6 | 0 | 0.5 | 4.0 | 2.88 | 0.0035 | 0.021 | 0.049 | NaOH | 8.65 | 75 | — |
|   | 96 |   |   |   |   |   |   |   | — | 75 | non-flowing |
| 7 | 0 | 0.5 | 4.0 | 2.88 | 0.0035 | 0.021 | 0.049 | NaOH | 8.7 | 75 | — |
|   | 24 |   |   |   |   |   |   | HCl | — | 75 | non-flowing |
| 8 | 0 | 0.5 | 4.0 | 2.88 | 0.0035 | 0.021 | 0.049 | Na$_3$PO$_4$ | 7.2 | 75 | — |
|   | 24 |   |   |   |   |   |   |   | 6.35 | 75 | — |
|   | 168 |   |   |   |   |   |   |   | — | 75 | non-flowing |
| 9 | 0 | 0.5 | 4.0 | 2.88 | 0.0035 | 0.021 | 0.049 | Na$_3$PO$_4$ | 8.0 | 75 | — |
|   | 24 |   |   |   |   |   |   |   | 7.75 | 75 | — |
|   | 168 |   |   |   |   |   |   |   | — | 75 | non-flowing |
| 10 | 0 | 0.5 | 4.0 | 2.88 | 0.0035 | 0.021 | 0.049 | Na$_3$PO$_4$ | 8.7 | 75 | — |
|   | 4.25 |   |   |   |   |   |   | HCl | 7.0 | 75 | — |
|   | 24 |   |   |   |   |   |   |   | 7.2 | 75 | — |
|   | 168 |   |   |   |   |   |   |   | — | 75 | non-flowing |
| 11 | 0 | 0 | 4.0 | 2.88 | 0 | 0.021 | 0.049 | Na$_3$PO$_4$ | 8.0 | 75 | — |
|   | 24 |   |   |   |   |   |   |   | 7.65 | 75 | — |
|   | 168 |   |   |   |   |   |   |   | — | 75 | liquid w/ precipitate |

*166,000 (0.01 × TF reading) = viscosity in cps
6,660 (0.01 × TB reading) = viscosity in cps

EXAMPLE 12

A hydrocarbon-bearing formation contains water having a temperature of 75° C. and a pH of 7. An aqueous solution of sodium hydroxide is injected into the formation via a well until the pH of the formation water reaches 8.5. 50 barrels of an aqueous reaction solution is prepared of 0.5% polyacrylamide, 2% phenol, and 1.44% formaldehyde. The solution is at ambient atmospheric temperature of 20° C. and has a pH of 5.5. The entire amount of the reaction solution is injected into the formation at a rate of 200 barrels per day via the injection well. The solution preferentially enters the highly permeable zones of the formation where it reacts upon reaching the formation water temperature. After four days, the solution sets in the highly permeable zones to a non-flowing, water insoluble polymer resin. The polymer resin substantially prevents migration of fluids into the highly permeable zones.

EXAMPLE 13

A well in the hydrocarbon-bearing formation of Example 12 is treated in the following manner. 50 barrels of an aqueous reaction solution is prepared containing 0.5% polyacrylamide, 2% phenol and 1.44% formaldehyde. The solution is at an ambient temperature of 20° C. and has a pH of 5.5. A concentrated sodium hydroxide solution is added to this solution in an amount sufficient to raise the pH of the solution of 8.5. Injection is begun immediately of the entire amount of the reaction solution into the formation at a rate of 400 barrels per day via the well. The solution preferentially enters the highly permeable zones of the formation where it reacts upon reaching the formation water temperature. After four days, the solution sets in the highly permeable zones to a non-flowing, water insoluble polymer resin. The polymer resin substantially prevents migration of fluids into the highly permeable zones.

The process and polymer resin as described herein are useful in the post-primary recovery of hydrocarbons from subterranean formations. The process and resin can also be applied to other subterranean uses where it is necessary to plug or seal a fluid permeable zone.

While the foregoing preferred embodiment of the invention has been described and shown, it is understood that the alternatives and modifications, such as those suggested and others, may be made thereto and fall within the scope of the invention.

What is claimed is:

1. A process for selectively plugging highly permeable zones of a subterranean formation comprising the steps of:
   (a) injecting an acrylamide polymer, a phenol and an aldehyde into the highly permeable zones via a well in fluid communication with said zones, wherein the moles of said phenol exceed the equivalents of unhydrolyzed acrylamide groups of said polymer and the equivalents of aldehyde groups of said aldehyde exceed the moles of said phenol; and
   (b) reacting said acrylamide polymer, phenol and aldehyde in situ at a temperature of from about 50° C. to about 100° C. and at a pH of from about 7 to about 12 for a time of from about 1 day to about 10 days to produce a polymer resin which substantially plugs said highly permeable zones.

2. The process of claim 1 wherein said polymer, phenol and aldehyde are combined in an aqueous solution at ambient atmospheric temperature prior to injecting into said zones.

3. The process of claim 1 wherein the ratio of equivalents of unhydrolyzed acrylamide groups:moles of phenol:equivalents of aldehyde groups injected into said zones is about 1:3:7.

4. The process of claim 1 wherein the molecular weight of said acrylamide polymer is from about 100,000 to about 10,000,000.

5. The process of claim 4 wherein the molecular weight of said acrylamide polymer is from about 1,000,000 to about 6,000,000.

6. The process of claim 5 wherein said acrylamide polymer is polyacrylamide wherein about 0% to about 40% by weight of the amide groups are hydrolyzed.

7. The process of claim 6 wherein about 100% of the amide groups of said polyacrylamide are unhydrolyzed.

8. The process of claim 1 wherein said aldehyde contains up to about 4 carbon atoms.

9. The process of claim 8 wherein said aldehyde is formaldehyde.

10. The process of claim 1 wherein said phenol is monohydroxylbenzene.

11. The process of claim 1 wherein said acrylamide polymer, phenol and aldehyde are reacted at a temperature of from about 70° C. to about 80° C.

12. The process of claim 1 wherein said acrylamide polymer, phenol and aldehyde are reacted for a time of from about two to about four days.

13. The process of claim 2 wherein the pH of said solution is adjusted to from about 7 to about 12 prior to injecting said solution.

14. The process of claim 13 wherein the pH of said solution is adjusted to from about 8 to about 9 prior to injecting said solution.

15. The process of claim 13 or 14 wherein the pH of said solution is adjusted by adding sodium hydroxide.

16. The process of claim 1 wherein the pH of water within said formation is adjusted to from about 8 to about 9 by pre-flushing said formation with an alkaline solution prior to injecting said acrylamide polymer, phenol and aldehyde.

17. The process of claim 1 wherein the pH of water within said formation is adjusted to from about 7 to about 5 after reaction of step (b) is initiated by injecting an acid into said formation.

18. The process of claim 17 wherein said acid is hydrochloric acid.

19. The process of claim 17 wherein said acid is injected into said formation from about 4 to about 48 hours after said injected acrylamide polymer, phenol and aldehyde reach the temperature of said formation.

* * * * *